March 30, 1954  C. G. PULLIN ET AL  2,673,696
HELICOPTER HAVING A JET-DRIVEN ROTOR SYSTEM
Filed May 20, 1947  2 Sheets-Sheet 1
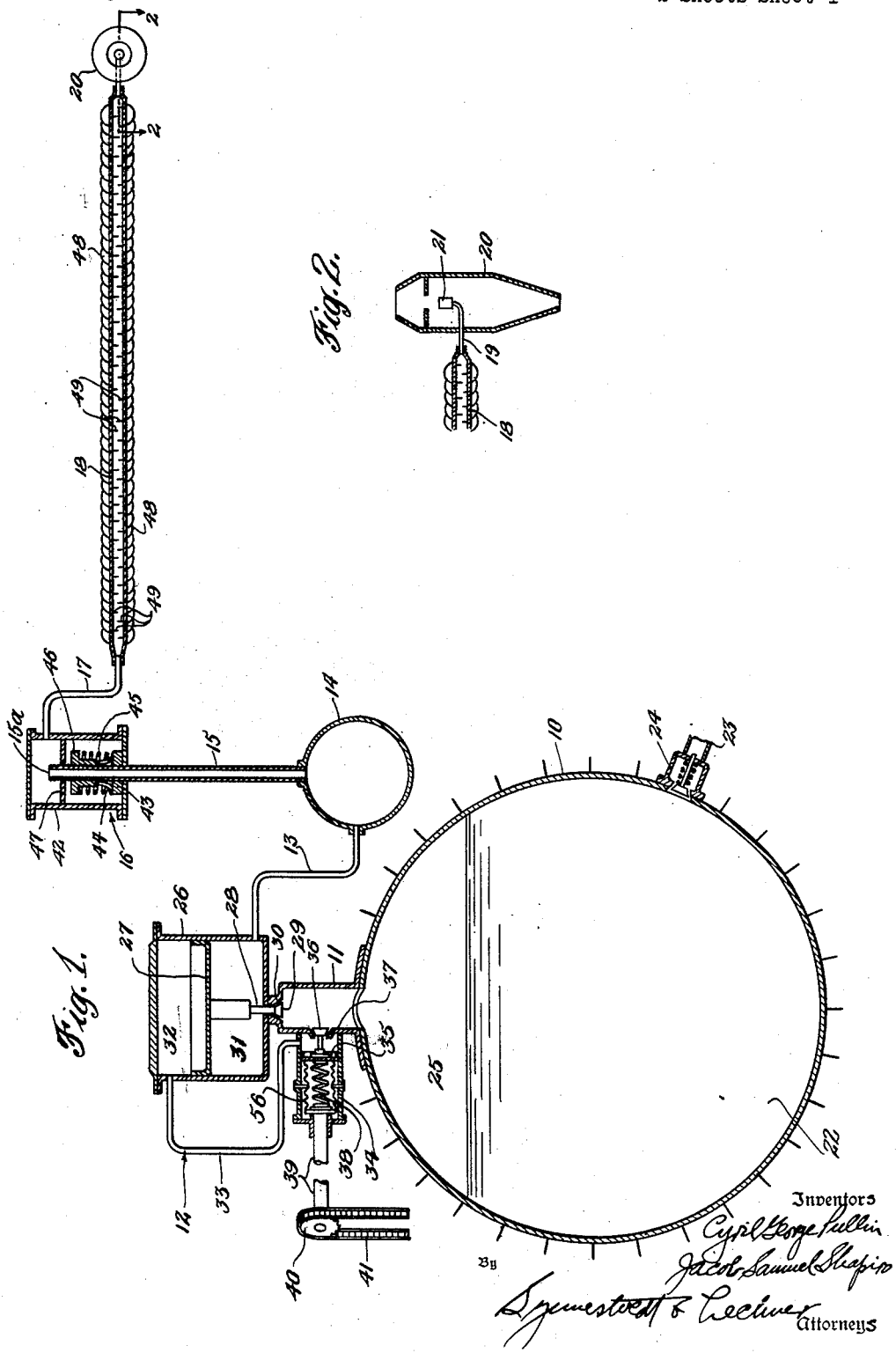

March 30, 1954 C. G. PULLIN ET AL 2,673,696
HELICOPTER HAVING A JET-DRIVEN ROTOR SYSTEM
Filed May 20, 1947 2 Sheets-Sheet 2
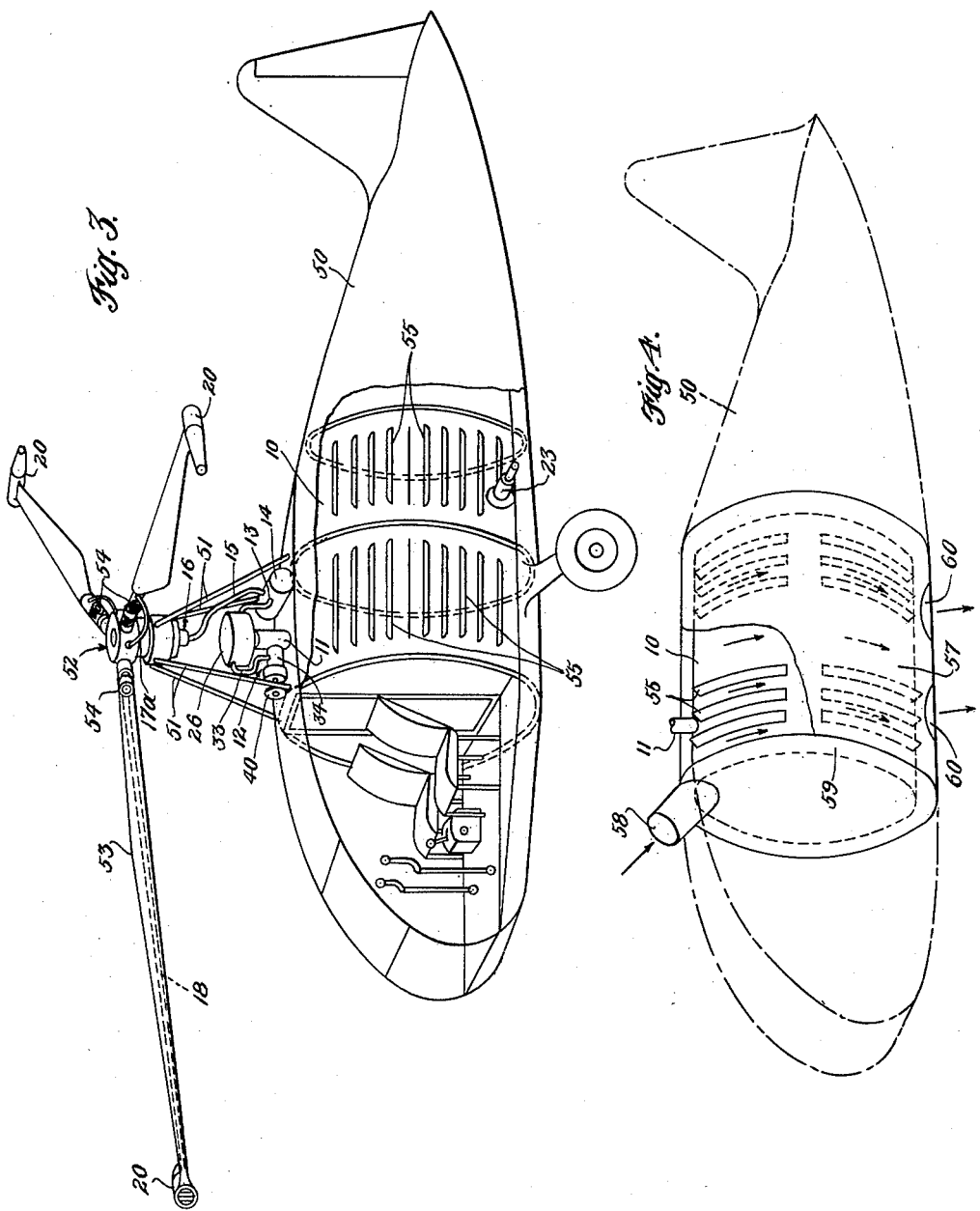
Inventors
Cyril George Pullin
Jacob Samuel Shapiro
By Synnestvedt & Lechner
Attorneys Patented Mar. 30, 1954

2,673,696

UNITED STATES PATENT OFFICE 2,673,696

HELICOPTER HAVING A JET-DRIVEN ROTOR SYSTEM

Cyril George Pullin, Tadburn, Ampfield, and Jacob Samuel Shapiro, London, England, assignors, by mesne assignments, to Autogiro Company of America, Philadelphia, Pa., a corporation of Delaware Application May 20, 1947, Serial No. 749,156

Claims priority, application Great Britain May 24, 1946

10 Claims. (Cl. 244—17.11)

This invention relates to prime movers of the kind in which a rotary member is driven by jet-reaction applied tangentially at a radial distance from the axis of rotation, the driving element being an aerothermodynamic propulsive duct (which may be of the continuous action type, otherwise known as a "ram-jet," or of the intermittent action type, or "impulsive duct"), and to the fuel supply system of such a prime mover.

Such a prime mover may, for example, constitute the power plant of a helicopter, as hereinafter more fully described; and other analogous applications are envisaged. The invention is applicable to all prime movers of the type above specified irrespective of the use to which they may be put.

In any practical application of such a prime mover system the peripheral speed of the propulsive duct must be high in order to obtain a reasonable propulsive efficiency, since the speed of the jet relative to the duct is necessarily high; and when a continuous action duct, or ram-jet, is used, high peripheral speed is also essential in order to obtain a reasonable thermal efficiency, which depends on the expansion ratio and hence on the ram-pressure. If the peripheral speed is high, the propulsive duct operates in an intense field of centrifugal force and this circumstance is the main feature of the problem of providing a suitable fuel and fuel feed arrangement for an aero-thermodynamic duct revolving at high speed in an orbit about a fixed point.

The basis of the present invention is the selection of a fuel of suitable characteristics, and the invention consists in combining with a prime mover of the specified type having a propulsive duct adapted to operate on the selected fuel, a fuel supply system which will deliver the fuel to the propulsive duct in the form of vapour.

The fuel we propose to employ is one whose principal constituent (amounting to not less than 90% by weight of the whole) is selected from the group of hydrocarbons consisting of normal butane, iso-butane, propane and mixtures of these substances, the essential feature of our preferred fuel being that its average volatility lies between the extremes represented by normal butane and propane respectively.

The fuel supply of such a prime mover will comprise a stationary container for fuel and a fuel line, which delivers fuel to the propulsive duct and of which a part is carried by the rotary member and rotates with it. This part of the fuel line imposes a centrifugal pumping action on the fuel, and in the fuel system of this invention this centrifugal pumping action alone is relied on for feeding the fuel to the propulsive duct.

The essential features of the invention are:

(1) The use of a pressure-retentive stationary fuel tank in which the fuel can be stored in the liquid state in equilibrium with its own vapour, so that the pressure in the tank is determined by and is equal to the vapour pressure of the fuel at the temperature at which it is stored, and (2) The provision of a pressure reducing valve through which the fuel passes on leaving the tank and before entering the rotative part of the fuel line.

The function of the pressure reducing valve is to ensure that the fuel is substantially vaporized and bring it to a pressure—usually well below the pressure of the vapour in the tank—such that the subsequent rise of pressure, due to the centrifugal compression, will be just sufficient to overcome the pressure drop through the nozzles of the burner in the duct and deliver the (vaporised) fuel against the ram-pressure in the duct.

A further important function of the pressure-reducing valve is to regulate the pressure to a constant value at the start of the centrifugal compression. This is important, since the rate of delivery of the fuel vapour depends on the pressure drop through the burner nozzles. It is therefore preferred to provide a pressure-reducing valve of a controllable type by which the constant pressure at the beginning of centrifugal compression can be controllably varied, and to use this control for regulating the pressure drop through the burner nozzles and hence the quantity of fuel supplied.

Steadiness of pressure on the low-pressure side of the reducing valve is promoted by providing an intermediate receiver of adequate capacity between reducing-valve and the rotative fuel line in which the centrifugal compression takes place.

It is essential to ensure that no appreciable re-condensation of the fuel vapour occurs during the centrifugal compression and that if the vapour is not initially dry it becomes so before reaching the burner nozzles. The possibility of re-condensation depends on a number of factors, of which the most important are the amount by which the pressure at the beginning of the centrifugal compression falls short of the pressure under which the vapour will condense at its temperature at this point, the temperatures at the beginning and end of the centrifugal compression and the centrifugal compression ratio which depends mainly on the peripheral speed of the propulsive duct.

Since the final pressure is dictated by the ram-pressure to be overcome and hence by the peripheral speed, which also dictates the centrifugal compression ratio within fairly close limits and hence the initial pressure, and the initial temperature is dictated by the temperature of the surrounding air—unless external heating is applied, which is not contemplated—the conditions to be observed for avoiding re-condensation, or for promoting drying, of the vapour are (1) the use of a fuel having a high enough vapour pressure at the ambient temperature, and (2) prevention of heat loss during the compression or/and promotion of re-heating by turbulence and internal friction at the expense of some loss of compression efficiency, which can be tolerated as the power expended in centrifugal pumping of the fuel vapour is generally a small fraction of the total power developed.

It is therefore preferable in most cases to lag the rotative fuel line thoroughly to avoid heat loss during the centrifugal compression, and it may be desirable to provide this fuel line with internal baffles, constrictions, expansion chambers or the like for promoting turbulence, or to make it of relatively small bore, so that the velocity of the vapour is high.

The vapour pressure in the fuel tank must be high enough to give an adequate pressure difference across the pressure-reducing valve to ensure its proper functioning, but if the tank has to withstand internal pressures much exceeding the atmospheric pressure it will have to be strengthened accordingly and this entails a corresponding weight penalty. The severest condition to be met with in this respect is operation at high altitude (i. e. low external pressure) in tropical conditions (i. e. high ambient temperature and possible exposure to intense direct solar radiation).

For this reason pure propane or a propane-rich mixed fuel will usually only be suitable for use in arctic conditions.

On the other hand, the evaporation of the fuel will tend to cool the liquid fuel in the tank from which the latent heat of evaporation must be derived, and unless this loss of heat is balanced by radiation or/and conduction through the tank walls from the air outside them, the temperature of the contents may fall to a point at which the vapour pressure is insufficient to maintain an adequate pressure difference across the pressure-reducing valve.

It may therefore be desirable to provide for adequate heat transfer through the tank walls to the fuel, e. g. by a dark surface coloration of the outside of the tank or by external finning of the tank walls; or by jacketing the tank and providing means for ventilating the jacket space.

In this connection it may be noted that if a "mixed" fuel is used, consisting e. g. of propane and normal or iso-butane, the vapour and liquid phases, when in equilibrium, will have different compositions, the vapour phase being richer than the liquid phase in the more volatile constituent.

If, as will normally be the case, the offtake from the tank is above the liquid level, so that the pressure-reducing valve has only to deal with vapour, the liquid will become progressively enriched in the less volatile constituent as the expenditure of fuel proceeds, with the result that the composition of the vapour fed to the propulsive duct will also change progressively calling for progressive adjustment of the pressure-reducing valve in order to maintain constant power. The enrichment may proceed far enough to reduce the vapour pressure over the liquid to a value insufficient to maintain an adequate pressure difference across the pressure-reducing valve unless external heating is applied to the tank.

To avoid this it may be desirable to put the offtake below the liquid level and modify the pressure-reducing valve to deal with liquid on the high-pressure side and act as an evaporating valve. In this way preferential expenditure of the more volatile constituent and progressive enrichment in the less volatile constituent may be avoided.

A fuel system as described above, when operating with a fuel as herein specified offers the following advantages:

On the one hand, the fuel is supplied to the propulsive duct as vapour. This avoids the practical difficulty of incorporating satisfactory fuel atomising or vaporising devices in a propulsive duct unit of the small size that will be appropriate to many of the contemplated applications of the invention, and eliminates the very high centrifugal pressure inevitably experienced with liquid fuel. For instance, the delivery pressure of a liquid fuel at a propulsive duct moving at 900 ft./s. will be of the order of 3500 lbs./in.$^2$ Further, the supply of fuel in the form of vapour obviates the difficulties associated with the behaviour of an atomised liquid spray in an intense centrifugal field (of the order of 1500 g.), which will act as a centrifugal separator.

Apart from the special difficulties encountered with a propulsive duct of small size or/and operating in an intense centrifugal field, the supply of fuel to a propulsive duct in the vapour state will give up to 10% improvement in combustion efficiency, and, by allowing a much shorter combustion chamber to be used than with liquid fuel, will improve overall efficiency still further, especially where external drag is an important consideration.

Existing technical knowledge and experience lead to the conclusion that the use of a gaseous or vaporised fuel is essential for the practical success of a subsonic propulsive duct, and the use of one or other of the fuels herein specified in conjunction with the fuel system of this invention meets this requirement and obviates the need for providing special vaporising apparatus. At the same time the excessive weight penalty inseparable from storage of a gaseous fuel such as hydrogen or methane under high pressure is avoided.

An incidental advantage of the fuels herein specified is their high calorific value which on a weight basis is about 6–7% greater than that of aviation spirit.

A further advantage in practical operation is that the availability of the fuel under pressure facilitates starting without any mechanical assistance especially when the propulsive duct is of the "impulse" or intermittent type.

Another advantage arises from the fact that owing to the molecular weight of the fuel being considerably greater than that of air, the centrifugal compression ratio of the fuel vapor will exceed considerably the ratio of absolute ram-pressure to absolute static pressure of the air. Consequently the pressure of the fuel vapour at the beginning of the centrifugal compression will usually be less than the static air pressure, notwithstanding the excess of fuel-pressure over ram-pressure at the propulsive duct required to feed the fuel vapour through the burner nozzles. As a result, any leakage that may occur at the gland connecting the stationary and rotative parts of the fuel system will be of air into the system and no loss of fuel will take place. With a well designed gland the leakage of air into the system will be small enough to do no harm.

The nature of the invention will be more fully understood from consideration of the accompanying drawings which illustrate schematically a typical example of a rotary prime mover system according to the invention and the installation of such a system in a helicopter for driving the lifting rotor. The characteristics of such a system using different fuels within the selected group and under different operating conditions will also be demonstrated by means of selected numerical examples.

In the drawings:

Fig. 1 is a schematic sectional view of the fuel supply of an aero-thermodynamic propulsive duct mounted at one extremity of an arm which can rotate about the axis at its other extremity;

Fig. 2 is a detail view in section along the line 2—2 of Fig. 1;

Fig. 3 is a schematic perspective view showing a prime mover system of the kind illustrated in Fig. 1 installed in a helicopter as a rotary driving power plant;

Fig. 4 is a schematic detail view in perspective of a jacketed and ventilated tank installation for a helicopter as shown in Fig. 3.

A typical prime mover system according to the invention consists essentially of a fixed structure, a rotary member, an aero-thermodynamic propulsive duct and a fuel supply system. The aero-thermodynamic propulsive duct is mounted on the rotary member and drives it by applying a peripheral tangential thrust. Fig. 1 illustrates schematically a propulsive duct and fuel system of such a prime mover, the fixed structure and rotary member being omitted for clearness and because the invention is not primarily concerned with them. A particular application of a prime mover as shown in Figs. 1 and 2 is illustrated in Fig. 3.

The fuel system shown in Fig. 1 comprises a pressure-retentive tank 10 with a vapour collecting neck 11, a pressure-reducing valve 12, a connecting pipe 13, an intermediate receiver 14, a stationary vapour-main 15, a rotary pipe connection or transfer gland generally indicated at 16, a connecting pipe 17 and a radially extending delivery pipe 18 connected to the burner 21 of the aero-thermodynamic duct 20 by a final pipe connection 19. Items 10–15 of the above are stationary being mounted on the fixed structure and items 17–21 rotate, being mounted on the rotary member of the prime mover; and the rotary gland 16 serves to connect the stationary and rotative parts of the fuel system.

The tank 10 is filled with fuel 22 in the liquid state through a filler connection 23 incorporating a non-return valve 24. The vapour space 25 of the tank communicates with the vapour collector neck 11 which in turn communicates with the intermediate receiver 14 through the pressure-reducing valve 12 and the pipe connection 13.

The pressure-reducing valve comprises a cylinder 26 containing a piston 27 whose stem 28 carries a valve 29 seating in a port 30 connecting the neck 11 with the space 31 on the under-side of piston 27 in cylinder 26, which space also communicates by way of the pipe connection 13 with the intermediate receiver 14. The space 32 above the piston 27 communicates through a balance pipe 33 with the space below a piston 35 in a small control cylinder 34. This space communicates by means of a port 37 with the interior of neck 11, and port 37 contains the seating for a valve 36 whose stem is rigidly connected to the piston 35, which is loaded in the direction for opening the port 37 by means of a spring 38 whose tension is adjustable by means of a screwed spindle 39, sprocket 40 and chain 41.

The vapour-main 15 extending from the intermediate receiver 14 terminates in a stand pipe 15ᵃ aligned on the rotative axis of the rotary parts of the system and extending coaxially into the rotary gland 16. The latter comprises a casing 42 in the base of which there is mounted a rotary sealing ring 43 surrounding the stand pipe 15ᵃ which carries a stationary flexible sealing washer 44, held tightly against the rotary sealing ring 43 by a spring 45 which is compressed by an abutment nut 46 screwed on to the stand pipe 15ᵃ. The casing 42 also has a diaphragm 47 through which the stand pipe 15ᵃ passes with a fine clearance.

The pipe 17 conveys fuel vapour from the space within the casing 42 above the diaphragm 47 to the delivery pipe 18 which extends radially from the neighbourhood of the axis of rotation of the rotary member to its periphery for connection to the propulsive duct 20 by the pipe 19. When the member carrying the pipe 18 is in rotation the fuel vapour in the pipe 18 is subjected to a centrifugal pressure rise from its central to its peripheral end, and the rotation of pipe 18 therefore exercises a pumping action on the fuel vapour by which it is sucked from the intermediate receiver 14 and is delivered to the propulsive duct 20.

As previously pointed out it is usually desirable to prevent heat loss from the fuel vapour during the centrifugal compression, and therefore the pipe 18 is shown as being heavily lagged with heat insulating material 48; and the interior of the pipe 18 is also shown as being provided with baffles 49, the purpose of which is to promote turbulence and thereby re-heat the vapour somewhat and oppose any tendency to recondensation in the process of centrifugal compression.

In the pressure-reducing valve 12, the pressure of vapour in the space below piston 35 in cylinder 34 is balanced by the effort of spring 38, whose tension is adjusted by sprocket 40. This vapour pressure is communicated by balance pipe 33 to space 32 where it is balanced by the pressure in space 31 on the other side of piston 27 and space 31 communicates with connection 13, the pressure in which is therefore maintained at a value governed by spring 38. In order to avoid any disturbance of the pressure balance by changes of atmospheric pressure and to enable the pressure in cylinder 34 and spaces 31 and 32 to be sub-atmospheric, an evacuated bellows 56 is attached to the rear face of piston 35 and encloses spring 38.

Fig. 3 illustrates the installation of a prime mover having a fuel system as illustrated in Figs. 1 and 2 in a helicopter as the power plant for driving the rotor.

The helicopter schematically illustrated in Fig. 3 has a body 50 in which are installed the fuel tank 10, with its filling connection 23 and vapour collecting neck 11, together with the pressure-reducing valve 12, comprising the cylinders 26 and 34, balance pipe 33 and regulating sprocket 40, and the pipe connection 13 and the intermediate vapour receiver or expansion chamber 14.

The structure of the helicopter also includes a conventional pylon or mast structure 51 supporting a rotor hub assembly, generally indicated at 52, to which the rotor blades 53 are articulated on pivotal mountings generally indicated at 54.

As in Fig. 1 the stationary vapour-main 15 extends upwards from the intermediate receiver 14 and is inserted centrally into the lower end of the rotary gland 16 which can be seen in Fig. 3 projecting axially from the lower end of the hub assembly 52. Part of the connections 17 of Fig. 1 are concealed within the hub assembly and are not shown in Fig. 3 but the hidden parts of these connections are prolonged by external flexible hoses 17ª which accommodate blade displacements on their pivotal mountings 54 and convey the vaporized fuel to the pipes 18, which are housed in each of the blades 53 and serve not only to convey but actually to pump the vaporised fuel from the intermediate receiver 14 to the propulsive ducts 20.

To assist heat interchange between the contents of the tank 10 and the outside air, the outer surface of the tank 10 of the example illustrated is provided with fins 55.

In the modification shown in Fig. 4, the tank 10 is surrounded by a jacket 57 and a scoop 58 directs air from the slip-stream of the rotor through the jacket space 59, the air escaping at 60. Fig. 4 does not show the rotor itself which is mounted as shown in Fig. 3. The fins 55 on the outside of the tank 10 are enclosed within the jacket 57 and are disposed circumferentially of the tank (and not axially as in Fig. 3) in order to conform to the general direction of the air flow through the jacket space.

The effect of different operating conditions and of different fuels within the selected group, on a system as described with reference to Fig. 1, will be better understood by consideration of the annexed table, in which operating pressures and temperatures at critical points of the system are set out for two representative fuels under five representative atmospheric conditions. The figures in the table are computed on the following assumptions:

(1) Peripheral speed of propulsive duct=900 ft. per sec.
(2) Efficiency of air compression by ramming=100%.
(3) Adiabatic efficiency of centrifugal compression of fuel vapour=60%.
(4) External loss of heat from fuel vapour during centrifugal compression =nil.
(5) Pressure drop across burner nozzles= 2 lb./in.²
(6) The temperature of the fuel vapour in the intermediate receiver is equal to the ambient atmospheric temperature.

The peripheral speed determines the work done in centrifugal compression per unit mass of fuel. By applying assumption (4) and inserting the physical constants of the fuel, the rise of temperature due to centrifugal compression can then be calculated; and since the initial temperature is known from assumption (6) the delivery temperature of the fuel at the burner can be determined. The final presure being known from assumptions (1), (2) and (5), the initial pressure in the intermediate receiver can then be calculated using assumption (3). The table also gives figures for "adiabatic) compression temperature"; this is the temperature that would be achieved if the fuel were adiabatically compressed from its actual state in the intermediate receiver to the final pressure at which it is actually delivered at the burner. These latter figures would be achieved in practice if the fuel suffered an external loss of heat during centrifugal compression which exactly compensated the re-heating effect due to inefficiency of compression, and give some indication of the effect of external heat loss during centrifugal compression.

Table

| Atmospheric Conditions | | I. C. A. N. Sea level | I. C. A. N. 10,000 feet | Tropical Summer Sea level | Sub Arctic Sea level | Arctic Sea level |
|---|---|---|---|---|---|---|
| Atmospheric pressure, lbs./in.² abs | | 14.7 | 10.1 | 14.7 | 14.7 | 14.7 |
| Atmospheric temperature, ° C | | +15 | −4.8 | +41 | −20 | −30 |
| Ram pressure (air), lbs./in.² abs | | 21.1 | 15.1 | 20.8 | 22.4 | 22.8 |
| Fuel delivery pressure at burner, lbs./in² abs | | 23.1 | 17.1 | 22.8 | 24.4 | 24.8 |
| Fuel temperature as delivered at burner, ° C | * | 58.6 | 38.8 | 84.6 | 23.6 | 13.6 |
| | ** | 48.2 | 28.4 | 74.2 | 13.2 | 3.2 |
| Fuel condensation temperature at delivery pressure, ° C. (approx) | * | 11 | 3 | 10 | 12 | 12 |
| | ** | −28 | −35 | −28 | −25 | −25 |
| Adiabatic compression temperature, ° C | * | 41.2 | 21.4 | 67.2 | 6.2 | −3.8 |
| | ** | 34.9 | 15.1 | 60.9 | −0.1 | −10.1 |
| Intermediate receiver pressure, lbs./in.² abs | * | 13.2 | 9.8 | 14.1 | 13.5 | 13.4 |
| | ** | 14.6 | 11.1 | 15.6 | 15.5 | 15.4 |
| Vapour pressure at atmospheric temperature, lbs./in.² abs | * | 25.0 | 12.5 | 56 | 6.2 | 3.9 |
| | ** | 102.4 | 57.9 | 193.2 | 34.8 | 23.2 |
| Pressure difference across tank walls, lbs./in.² | * | 10.3 | 2.4 | 41.3 | 8.5 | 10.8 |
| | ** | 87.7 | 47.8 | 178.5 | 20.1 | 8.5 |

*Normal Butane.
**Propane.

Underlined figures in the table draw attention to conditions that are unworkable or unacceptable. The system will not operate if the pressure called for in the intermediate receiver is greater than the vapour pressure in the tank; neither will it operate if the fuel is delivered to the burner at a temperature below that at which it will condense under the pressure to which it has been centrifugally compressed. Again, tank pressures exceeding about 50 lb./in.$^2$ would call for a prohibitively heavy tank structure, at least for any aeronautical application of the prime mover.

It can therefore be concluded from inspection of the table that for arctic or sub-arctic conditions normal-butane is not suitable, being insufficiently volatile. Iso-butane would not be much better, but propane would be satisfactory. A mixture of propane and iso-butane might also be satisfactory, subject to the qualifying comments made above with respect to "selective" evaporation and progressive change of fuel composition when using a "mixed" fuel. In tropical conditions propane is too volatile, leading to high tank pressures; but normal- (or iso-) butane would be satisfactory. Figures are not given for iso-butane as it does not differ very much from the normal-butane, but is rather more volatile.

We claim:

1. In a rotary prime mover having a rotary member adapted to be driven by jet-reaction applied tangentially at a radial distance from the axis of rotation, a driving element comprising an aero-thermodynamic propulsive duct constructed to take in at the zone of combustion at least the major proportion of the air required for combustion and adapted to use a fuel supplied to it in the vapour state, and disposed substantially at the outermost end of said rotary member, a radially extending fuel line carried by the rotary member and connected to deliver vaporized fuel to said propulsive duct, a stationary pressure-retentive tank adapted to store the fuel in the state of liquid in equilibrium with its own vapour, and a balanced pressure reducing valve through which the fuel is delivered from the tank to the line carried by the rotary member.

2. The combination claimed in claim 1, in which the balanced pressure reducing valve has means of regulation to vary its delivery pressure.

3. The combination claimed in claim 1, in which the fuel tank is jacketed and means are provided for ventilating the jacket space to thereby provide a source of energy for facilitating the maintenance of said equilibrium condition.

4. The combination claimed in claim 1, in which the radially extending fuel line carried by the rotary member is lagged to minimise loss of heat by the vapourised fuel during its radially outward flow, in the course of which it is centrifugally compressed.

5. An aircraft having a body and a bladed sustaining rotor, including a stationary pressure-retentive tank adapted to store fuel in the state of liquid in equilibrium with its own vapor, a jet device spaced at substantially the farthermost point from the rotor center and adapted to drive the rotor, said jet comprising an aero-thermodynamic propulsive duct constructed to take in at the zone of combustion at least the major proportion of the air required for combustion and adapted to use the fuel supplied to it in the vapor state, and a radially-extending fuel line connected to deliver vaporized fuel from said tank to said duct and constructed and disposed within a blade of the rotor as to act as a centrifugal vapour compressor when the sustaining rotor is rotating.

6. A construction according to claim 5 wherein said liquid fuel storage means forms a substantial part of a peripheral wall of said body whereby to absorb heat from an external source.

7. The construction of claim 6 including a jacket or hood connected in heat transfer relation with at least a major portion of said storage means, said hood having an air outlet and further having an air inlet including an opening oriented with respect to the slip stream of said rotor for effecting a flow of air from said slip stream into the air inlet.

8. An aircraft rotor blade having a duct for delivery of vaporized or gaseous fuel to a blade jet device, and a plurality of turbulence-producing baffle structures mounted transversely of the duct and serially positioned along the axis of the duct.

9. An aircraft rotor blade having a duct for delivery of vaporized or gaseous fuel to a blade jet device, a plurality of turbulence-producing baffle structures serially disposed along the axis of the duct and mounted transversely thereof and means thermally insulating said duct, whereby to minimize condensation therein.

10. A construction in accordance with claim 5 further including a plurality of turbulence-producing baffle structures mounted within and transversely of and serially positioned along the axis of said radially extending fuel line.

CYRIL GEORGE PULLIN.
JACOB SAMUEL SHAPIRO.

References Cited in the file of this patent

UNITED STATES PATENTS

| Number | Name | Date |
|---|---|---|
| 2,073,298 | Ensign | Mar. 9, 1937 |
| 2,142,601 | Bleecker | Jan. 3, 1939 |
| 2,240,846 | Hanson | May 6, 1941 |
| 2,330,056 | Howard | Sept. 21, 1943 |
| 2,340,954 | Garretson | Feb. 8, 1944 |
| 2,377,607 | Bodine | June 5, 1945 |
| 2,485,502 | McCollum | Oct. 18, 1949 |

FOREIGN PATENTS

| Number | Country | Date |
|---|---|---|
| 227,151 | Great Britain | Jan. 12, 1925 |
| 293,594 | Great Britain | June 15, 1927 |
| 557,011 | Great Britain | Nov. 1, 1943 |
| 409,379 | France | Feb. 17, 1910 |
| 423,590 | France | Feb. 20, 1911 |
| 859,640 | France | June 10, 1940 |
| 865,452 | France | Feb. 24, 1941 |